United States Patent
Wang et al.

(10) Patent No.: US 12,418,243 B2
(45) Date of Patent: Sep. 16, 2025

(54) MULTI-PORT ENERGY STORAGE BATTERY AND MULTI-PORT ENERGY STORAGE BATTERY PACK

(71) Applicant: FranklinWH Energy Storage Inc., San Jose, CA (US)

(72) Inventors: Daqing Wang, Shenzhen (CN); Yuezhen Hu, Shenzhen (CN); Haisheng Song, Shenzhen (CN); Shixian Xu, Shenzhen (CN); Xiaolong Luo, Shenzhen (CN)

(73) Assignee: Franklin WH Energy Storage Inc., San Jose, CA (US)

( * ) Notice: Subject to any disclaimer, the term of this patent is extended or adjusted under 35 U.S.C. 154(b) by 245 days.

(21) Appl. No.: 18/355,760

(22) Filed: Jul. 20, 2023

(65) Prior Publication Data
US 2023/0361688 A1   Nov. 9, 2023

Related U.S. Application Data

(63) Continuation-in-part of application No. 17/560,370, filed on Dec. 23, 2021, now Pat. No. 12,015,293, (Continued)

(30) Foreign Application Priority Data

May 26, 2020   (CN) .......................... 202010457131.8

(51) Int. Cl.
*H02M 3/335*   (2006.01)
*H01M 10/42*   (2006.01)
(Continued)

(52) U.S. Cl.
CPC ..... *H02M 3/33584* (2013.01); *H01M 10/425* (2013.01); *H02J 7/34* (2013.01); (Continued)

(58) Field of Classification Search
CPC ............................. H02J 3/32; H02M 3/33584
See application file for complete search history.

(56) References Cited

U.S. PATENT DOCUMENTS

| 2013/0088084 | A1* | 4/2013 | Szu | ............. | H02J 1/10 |
| | | | | | 307/66 |
| 2014/0285020 | A1* | 9/2014 | Yang | ............. | H02J 7/0044 |
| | | | | | 307/43 |

(Continued)

FOREIGN PATENT DOCUMENTS

| CN | 102290999 A | 12/2011 |
| CN | 204905915 U | 12/2015 |

(Continued)

OTHER PUBLICATIONS

International Search Report of PCT Patent Appli tion No. PCT/CN2020/096049 issued on Feb. 24, 2021.

*Primary Examiner* — Gary A Nash
(74) *Attorney, Agent, or Firm* — ANOVA LAW GROUP, PLLC

(57) ABSTRACT

The present application discloses a multi-port energy storage battery and a multi-port energy storage battery pack. The multi-port energy storage battery includes: a first port, a second port and a third port, where the first port is a 48V DC voltage port, the second port is a 400V DC voltage port, and the third port is a 120/240V AC voltage port; a battery module, including a first interface, the first interface is coupled to the first port, the battery module provides 48V DC current; a bidirectional integrated converter, operating in a DC-DC converting mode, a AC-DC converting mode or a DC-AC converting mode, where the bidirectional integrated converter is respectively connected to the first port, the second port, and the third port, and one of the first port, the second port, and the third port is connected to external power supply.

7 Claims, 5 Drawing Sheets

Related U.S. Application Data which is a continuation of application No. PCT/CN2020/096049, filed on Jun. 15, 2020.

(51) Int. Cl.
*H02J 7/34* (2006.01)
*H02M 1/00* (2006.01)
*H02M 7/217* (2006.01)
*H02M 7/537* (2006.01)
*H02J 3/32* (2006.01)

(52) U.S. Cl.
CPC ........... *H02M 1/007* (2021.05); *H02M 7/217* (2013.01); *H02M 7/537* (2013.01); *H01M 2010/4271* (2013.01); *H02J 3/32* (2013.01)

(56) References Cited

U.S. PATENT DOCUMENTS

| | | | | |
|---|---|---|---|---|
| 2016/0176305 A1* | 6/2016 | James | ................. | H02J 3/38 |
| | | | | 307/26 |
| 2016/0294204 A1* | 10/2016 | Deokar | ................. | H02J 7/34 |

FOREIGN PATENT DOCUMENTS

| | | | | | |
|---|---|---|---|---|---|
| CN | 107508331 A | | 12/2017 | | |
| CN | 108233421 A | * | 6/2018 | ............... | H02J 3/32 |
| CN | 110098658 A | | 8/2019 | | |

* cited by examiner

MULTI-PORT ENERGY STORAGE BATTERY AND MULTI- PORT ENERGY STORAGE BATTERY PACK

CROSS-REFERENCE TO RELATED APPLICATION

This application is a continuation-in-part of U.S. patent application Ser. No. 17/560,370, filed on Dec. 23, 2021, which is a continuation of International Patent Application No. PCT/CN2020/096049, filed on Jun. 15, 2020, which claims priority to Chinese Patent Application No. 202010457131.8, filed on May 26, 2020, and the entirety of all of which is incorporated herein by reference.

TECHNICAL FIELD

The present disclosure relates to battery technology, and in particular to a multi-port energy storage battery and a multi-port energy storage battery pack.

BACKGROUND

In recent years, with the development of new energy sources, photovoltaic systems are more and more used in households, especially in well-lit areas, where photovoltaic power generation has brought tangible benefits to people.

Photovoltaic power generation can be carried out during the day, but after the sun goes down, it is impossible to continue photovoltaic power generation and use solar energy. With the development of lithium battery, this problem has been solved. Household battery system, or household battery pack, can cooperate with photovoltaic system to store solar energy in the battery pack by charging the battery during the day, and then release the electricity of the battery pack at night for household use.

This solution can certainly solve the problem of solar energy storage, but because there are many brands and models of photovoltaic DC (Direct Current)-AC (Alternating Current) converter cooperating with batteries, the photovoltaic DC-AC converter put into use earlier have no battery interface, or the voltage levels of battery interfaces are inconsistent, for example, some voltage levels are 400V, others are 48V and so on. This brings a lot of problems. Once the user selects a certain photovoltaic DC-AC converter, when matching the energy storage solutions, there are few battery solutions to choose, and the related batteries have poor expandability and substitutability, which makes the investment income of solar energy decline and affects the user experience.

SUMMARY

The present application provides a multi-port energy storage battery to realize that the battery can adapt to different voltage levels and voltage types.

A multi-port energy storage battery, includes:
a first port, a second port and a third port, where the first port is a 48V DC voltage port, the second port is a 400V DC voltage port, and the third port is a 120/240V AC voltage port;
a battery module, including a first interface, the first interface is coupled to the first port, the battery module provides 48V DC current;
a bidirectional integrated converter, operating in a DC-DC converting mode, a AC-DC converting mode or a DC-AC converting mode, where the bidirectional integrated converter is respectively connected to the first port, the second port, and the third port, and one of the first port, the second port, and the third port is connected to external power supply.

In an embodiment where the multi-port energy storage battery needs to be charged, the first port is connected to the external power supply when the charging voltage provided by the external power supply is 48V DC voltage; in an embodiment where the charging voltage provided by the external power supply is 400V DC voltage, the second port is connected to the external power supply, and the bidirectional integrated converter operates in the DC-DC converting mode to reduce the charging voltage provided by the external power supply to 48V DC voltage and charge the 48V DC voltage into the battery module through the second port; and, in an embodiment where the charging voltage provided by the external power supply is 120/240V AC voltage, the third port is connected to the external power supply, and the bidirectional integrated converter operates in the AC-DC converting mode, converts the 120/240V AC voltage provided by the external AC power supply into 48V DC voltage, and then charges the 48V DC voltage into the battery module through the third port.

In an embodiment where the multi-port energy storage battery needs to be discharged, when the external demand voltage is the 48V DC voltage, the first port is used as an output port, and the battery module directly supplies external power through the first port; when the external demand voltage is 400V DC voltage, the second port is used as an output port, and the bidirectional integrated converter operates in the DC-DC converting mode to boost the 48V DC power provided by the battery module to 400V DC voltage and output the 400V DC voltage through the second port; and when the external demand voltage is 120/240V AC voltage, the third port is used as the output port, and the bidirectional integrated converter operates in the DC-AC converting mode, the 48V DC power provided by the battery module is converted into 120/240V AC voltage through the bidirectional integrated converter and output through the third port.

This application also provides a multi-port energy storage battery pack, including multiple multi-port energy storage batteries, wherein the first ports of the multiple multi-port energy storage batteries are connected to each other, the second ports of the multiple multi-port energy storage batteries are connected to each other, the third ports of the multiple multi-port energy storage batteries are coupled to each other, and the multiple multi-port energy storage batteries communicate with each other through a communication interface.

DETAILED DESCRIPTION OF DISCLOSED EMBODIMENTS

The application will be described in further detail with reference to the drawings and embodiments.

It should be understood that the terms "first", "second" and the like can be used herein to describe various directions, actions, steps or elements and the like, but these directions, actions, steps or elements are not limited by these terms. These terms are only used to distinguish a (an) direction, action, step or element from another direction, action, step or element. For example, without departing from the scope of this application, the first module can be referred to as the second module, and similarly, the second module can be referred to as the first module. The first module and the second module are both modules, but they are not the same module. The terms "first", "second" and so on cannot be understood as indicating or implying relative importance or implicitly indicating the number of the said technical features. Thus, the features defined by "first" and "second" may explicitly or implicitly include one or more of the features. In the description of the embodiments of this application, "plural" means at least two, such as two, three, etc., unless otherwise specifically defined. Further, the singular terms "a", "an" and "the" include plural reference and vice versa unless the context clearly indicates otherwise.

Embodiment 1

Figure 1:
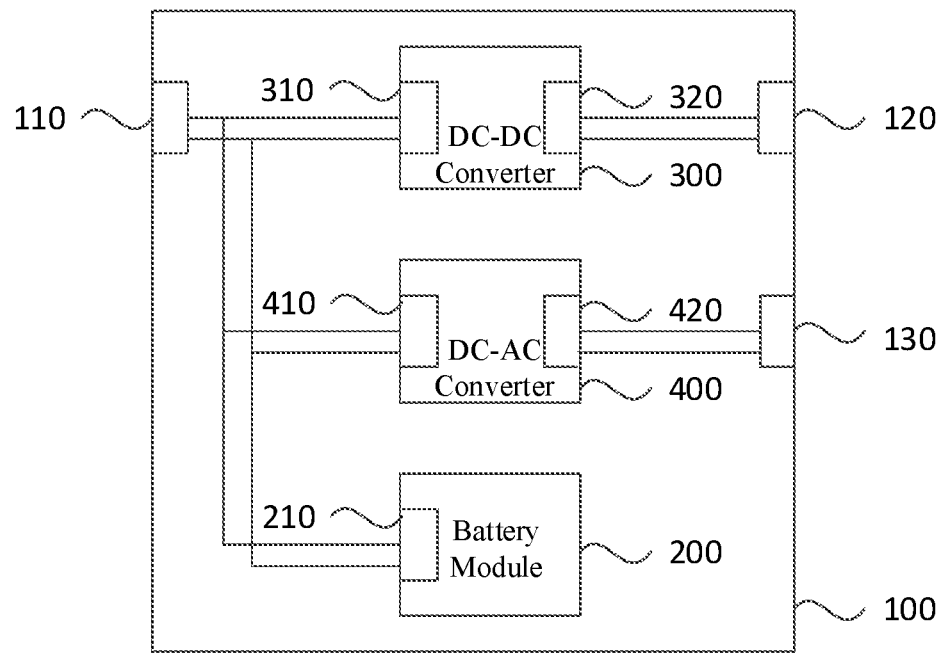
FIG. 1 is a structural schematic diagram of a multi-port energy storage battery provided in the Embodiment one of the present application.

As shown in FIG. 1, the first embodiment of the present application provides a multi-port energy storage battery, which includes a battery case 100, a battery module 200, a DC-DC converter 300 and a DC-AC converter 400.

The battery case 100 includes a first port 110, a second port 120 and a third port 130; the battery module 200 includes a first interface 210, the first interface 210 is connected with the first port 110; the battery module 200 is configured to be connected with an external power supply module via the first port 110 and first interface 210 for charging. A DC-DC converter 300 includes a second interface 310 and a third interface 320, the second interface 310 is connected with the first interface 210, and the third interface 320 is connected with the second port 120. The DC-DC converter 300 is configured to boost a battery voltage to a high DC voltage and then output it via the second port 120. The DC-AC converter 400 includes a fourth interface 410 and a fifth interface 420. The fourth interface 410 is connected with the first interface 210, and the fifth interface 420 is connected with the third port 130. The DC-AC converter 400 is configured to convert a battery voltage into an alternating current and then output it via the third port 130. The battery module 200 is further configured to be connected to an external power supply module via the second port 120, DC-DC converter 300 and first interface 210 for charging. The battery module 200 is further configured to be connected to an external power supply module via the third port 130, DC-AC converter 400 and first interface 210 for charging.

In this embodiment, the multi-port energy storage battery can be used in any scenarios requiring charging and discharging. When charging is required, if the charging voltage provided by the external power supply module is the same as the battery voltage of the battery module 200, for example, both are 48V DC, the external power supply module can be directly connected to the first port 110, and then the external power supply module can charge the battery module 200 via the first port 110 and the first interface 210. If the charging voltage provided by the external power supply module is DC high voltage, such as 400V DC, the external power supply module needs to be connected to the second port 120 in this case. The external power supply module charges the battery module 200 via the second port 120, the third interface 320, the second interface 310 and the first interface 210, that is, the charging voltage provided by the external power supply module needs to be stepped down to 48V DC by the DC-DC converter 300 before charging the battery module 200. If the charging voltage provided by the external power supply module is AC, such as 220V AC, the external power supply module needs to be connected to third port 130 in this case. The external power supply module charges the battery module 200 via the third port 130, the fifth interface 420, the fourth interface 410 and the first interface 210, that is, the charging voltage provided by the external power supply module needs to be converted into 48V DC by the DC-AC converter 400 before charging the battery module 200.

When discharging is required, if the user's required voltage is the same as the battery voltage of battery module 200, for example, both are 48V DC, the consumer appliance can be directly connected to the first port 110, and then battery module 200 can output the working voltage to the consumer through via the first interface 210 and first port 110. If the user's required voltage is DC high voltage, such as 400V DC, the consumer appliance needs to be connected to the second port 120 in this case. The battery module 200 outputs the working voltage to the consumer appliance via the first interface 210, the second interface 310, the third interface 320 and the second port 120, that is, the working voltage provided by the battery module 200 needs to be boosted to 400V DC by the DC-DC converter 300 before being output to the consumer appliance. If the user's required voltage is AC, such as 220V AC, the consumer appliance needs to be connected to the third port 130 in this case. The battery module 200 outputs the working voltage to the consumer appliance via the first interface 210, the fourth interface 410, the fifth interface 420 and the third port 130, that is, the working voltage provided by the battery module 200 needs to be converted into 220V AC by the DC-AC converter 400 before being output to the consumer appliance.

The embodiment of this application provides a battery case 100, including a first port 110, a second port 120 and a third port 130; and a battery module 200, including a first interface 210, the first interface 210 is connected to the first port 110, and the battery module 200 is configured to connect an external power supply module via a first port 110 and first interface 210 for charging. A DC-DC converter 300, including a second interface 310 and a third interface 320, the second interface 310 is connected with the first interface 210, the third interface 320 is connected with the second port 120, and the DC-DC converter 300 is configured to boost a battery voltage to a DC high voltage and then output it via the second port 120; A DC-AC converter 400, including a fourth interface 410 and a fifth interface 420, the fourth interface 410 is connected with the first interface 210, and the fifth interface 420 is connected with the third port 130. The DC-AC converter 400 is configured to convert a battery voltage into an alternating current and then output it through the third port 130. The above solves the docking adaptability problem of the battery and realizes the effect that the battery can adapt to different voltage levels and voltage types.

Embodiment 2

Figure 2:
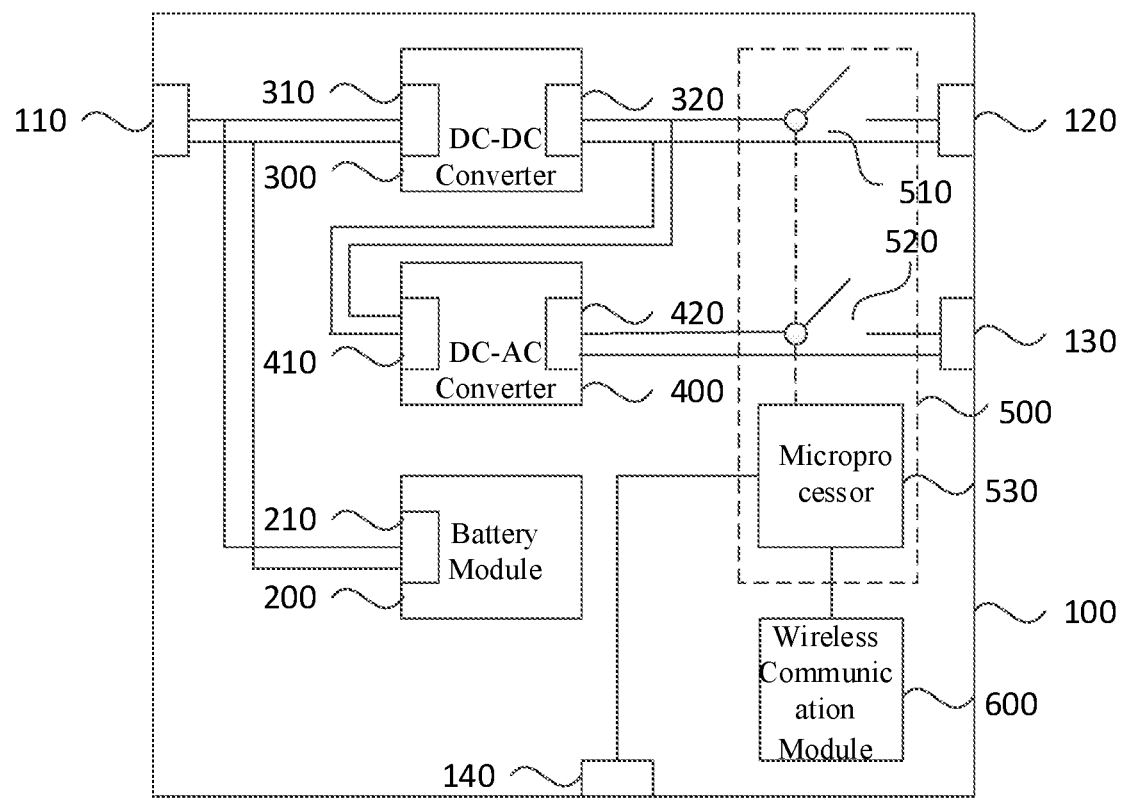
FIG. 2 is a structural schematic diagram of a multi-port energy storage battery provided in the Embodiment two of the present application.

As shown in FIG. 2, the second embodiment of this application provides a multi-port energy storage battery, which is an improvement based on Embodiment 1 of this application. The multi-port energy storage battery provided by this embodiment further includes a control module 500 and a wireless communication module 600.

The control module 500 includes a first switch 510 installed in the second port 120, a second switch 520 installed in the third port 130 and a microprocessor 530, the microprocessor 530 is configured to control the opening and closing of the first switch 510 and the second switch 520. The wireless communication module 600 is connected with the microprocessor 530. The wireless communication module 600 is configured to receive wireless control instructions to control the microprocessor 530. The battery case 100 may further include a communication port 140, and the microprocessor 530 is configured to connect with an external host computer via the communication port 140, which supports RS (Recommendation Standard)-485 or CAN bus (Controller Area Network) communication protocol.

In this embodiment, the battery case 100 is configured to house the battery module 200, DC-DC converter 300 and DC-AC converter 400 inside the battery case 100. The third interface 320 is further connected to the fourth interface 410, and the fourth interface 410 is connected via the third interface 320, DC-DC converter 300, second interface 310 and first interface 210. The DC-AC converter 400 is also configured to convert DC high voltage into alternating current and output it through the third port 130. The battery module 200 is further configured to be connected to an external power supply module via the second port 120, DC-DC converter 300 and first interface 210 for charging. The battery module 200 is further configured to be connected to an external power supply module via the third port 130, DC-AC converter 400, DC-DC converter 300 and first interface 210 for charging.

The external power supply module includes a photovoltaic DC-AC converter. The multi-port energy storage battery can be used in the scene of charging and discharging between the photovoltaic DC-AC converter and the battery of the household photovoltaic system. The capacity requirement for household energy storage can be 10 kWh. Accordingly, the battery module 200 is set as a 48V low-voltage system. When charging through the photovoltaic DC-AC converter during the day, if the charging voltage of the interface provided by the photovoltaic DC-AC converter is the same as the battery voltage of the battery module 200, both of which are 48V DC, the photovoltaic DC-AC converter can be directly connected to the first port 110. Then, the photovoltaic DC-AC converter can charge the battery module 200 via the first port 110 and the first interface 210. If the charging voltage of the interface provided by the photovoltaic DC-AC converter is DC high voltage, such as 400V DC, the photovoltaic DC-AC converter needs to be connected to the second port 120 in this case. The battery module 200 is charged by the photovoltaic DC-AC converter via the second port 120, the third interface 320, the second interface 310 and the first interface 210, that is, the charging voltage provided by the photovoltaic DC-AC converter needs to be reduced to 48V DC by the DC-DC converter 300 before charging the battery module 200. If the photovoltaic DC-AC converter does not provide an interface, the commercial power provided by the photovoltaic system to users, such as 220V AC power or 120/240V split-phase AC power, can be directly used to connect the commercial power to third port 130. The commercial power charges the battery module 200 via the third port 130, the fifth interface 420, the fourth interface 410, the third interface 320, the DC-DC converter 300, the second interface 310, and the first interface 210, that is, the charging voltage provided by commercial power needs to be converted into 48V DC by DC-AC converter 400 and DC-DC converter 300 before charging the battery module 200.

When the photovoltaic system can't supply power at night and the multi-port energy storage battery needs to be discharged, if the required voltage of the user is the same as the battery voltage of the battery module 200, for example, both are 48V DC, the user can control the wireless communication module 600 to send a communication signal to release 48V DC through the mobile phone. The wireless communication module 600 then controls the microprocessor 530 to disconnect the first switch 510 and the second switch 520, or controls the host computer to send a communication signal to release 48V DC. Then, the host computer controls the microprocessor 530 via the communication port 140, so that the first switch 510 and the second switch 520 are disconnected, users can directly access the first port 110 with consumer appliance, and then the power module can output the working voltage to the users via the first interface 210 and the first port 110. If the user's required voltage is DC high voltage, such as 400V DC, the user can control the wireless communication module 600 to send out a communication signal to release 400V DC through the mobile phone. The wireless communication module 600 then controls the microprocessor 530 to turn the first switch 510 on and the second switch 520 off, or by controlling the host computer to send a communication signal to release 400V DC. The host computer then controls the microprocessor 530 via the communication port 140, so that the first switch 510 is closed and the second switch 520 is disconnected, and then the consumer appliance is connected to the second port 120. The power module 200 outputs the working voltage to the consumer appliance via the first interface 210, the second interface 310, the third interface 320 and the second port 120, that is, the working voltage provided by the battery module 200 needs to be boosted to 400V DC by the DC-DC converter 300 before being output to the consumer appliance.

If the user's required voltage is AC, that is, when the multi-port energy storage battery is directly connected to the home power grid, such as AC of 220V, 230V or 120/240V split-phase, the user can control the wireless communication module 600 to send communication signals to release AC of 220V, 230V or 120/240V split-phase through the mobile phone. The wireless communication module 600 then controls the microprocessor 530 to turn off the first switch 510 and turn off the second switch 520, or controls the host computer to send out a communication signal to release the alternating current of 220V, 230V or 120/240V split-phase. The host computer then controls the microprocessor 530 via the communication port 140, so that the first switch 510 is turned off and the second switch 520 is turned off. At this time, the home power grid needs to be connected to the third port 130, the battery module outputs working voltage to home power grid via the first interface 210, second interface 310, DC-DC converter 300, third interface 320, fourth interface 410, fifth interface 420 and third port 130, that is, the working voltage provided by the battery module 200 needs to be converted into 220V, 230V or 120/240V split-phase AC power by the DC-DC converter 300 and the DC-AC converter 400 before being output to the home grid. Third port 130 includes three interfaces: zero line, live line and three interfaces of output live line. Adaptively, the user can also control the first switch 510 and the second switch 520 to be closed at the same time, so as to meet the user's requirement of using AC and DC at the same time. The specific control steps and current flow direction are the same as those described above, and the embodiment of this application will not be repeated here.

Figure 3:
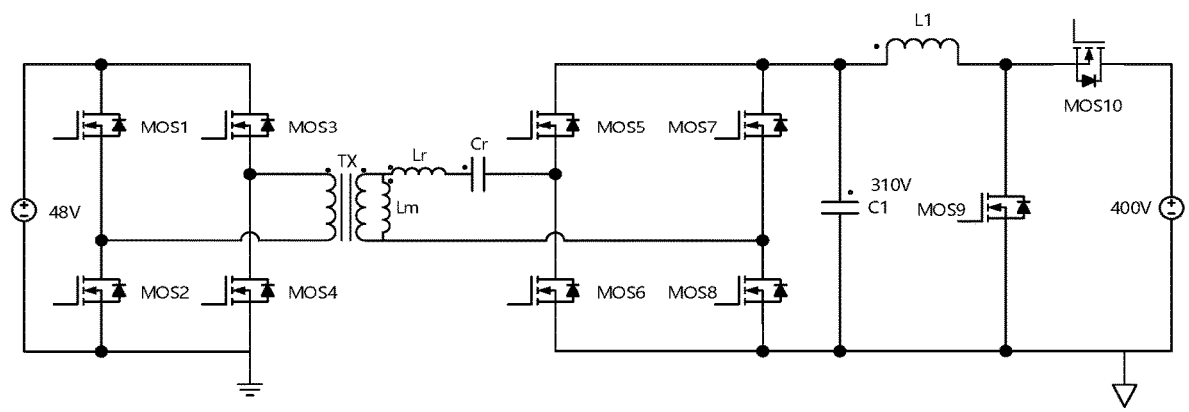
FIG. 3 is a structural schematic diagram of a DC-DC converter provided in the Embodiment two of the present application.
Figure 4:
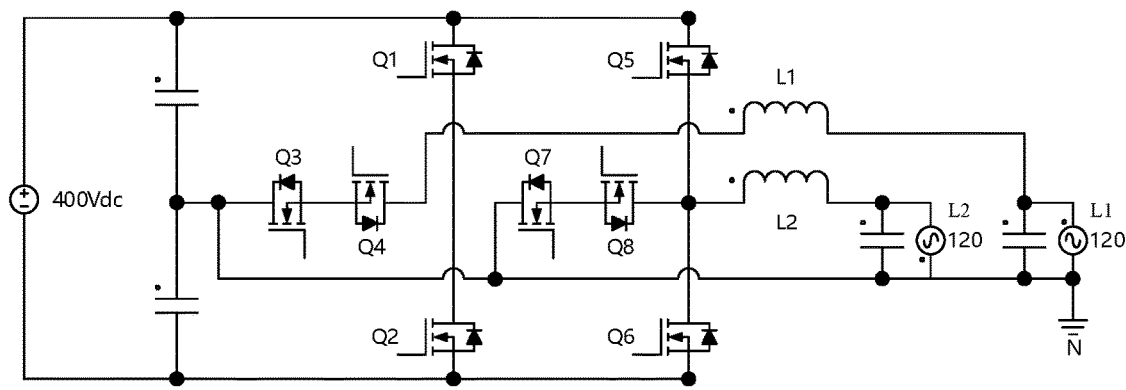
FIG. 4 is a structural schematic diagram of a DC-AC converter provided in the Embodiment two of the present application.

As shown in FIG. 3, the DC-DC converter 300 in this embodiment is composed of LLC (resonant circuit), BUCK (step-down converter circuit) or two-stage BOOST (boost chopper) converter, including MOS transistors, capacitors, inductors, etc., which can convert 48V DC to 400 V DC, and also can reverse the 400V DC to 48V DC. As shown in FIG. 4, the DC-AC converter 400 in this embodiment is a T-shaped three-level DC-AC converter, which includes triodes, capacitors, inductors, etc., and can convert 400V DC into 120/240V split-phase AC. Similarly, it can reverse the 120/240V split-phase AC into 400V DC.

In an alternative embodiment, the multi-port energy storage battery may further include a fourth port and a fifth port, and a DC-DC converter 300 or a DC-AC converter 400 may be included adaptively, so as to provide input and output interfaces for different voltage levels and voltage types.

The embodiment of this application provides a battery case 100, including a first port 110, a second port 120 and a third port 130; and a battery module 200, including a first interface 210, the first interface 210 is connected to the first port 110, and the battery module 200 is configured to connect an external power supply module via a first port 110 and first interface 210 for charging. A DC-DC converter 300, including a second interface 310 and a third interface 320, the second interface 310 is connected with the first interface 210, the third interface 320 is connected with the second port 120, and the DC-DC converter 300 is configured to boost a battery voltage to a DC high voltage and then output it via the second port 120; A DC-AC converter 400, including a fourth interface 410 and a fifth interface 420, the fourth interface 410 is connected with the first interface 210, and the fifth interface 420 is connected with the third port 130. The DC-AC converter 400 is configured to convert a battery voltage into an alternating current and then output it through the third port 130. The application solves the docking adaptability problem of the battery and the photovoltaic DC-AC converter, and realizes the effect that the battery can adapt to different voltage levels and voltage types.

Embodiment 3

Figure 5:
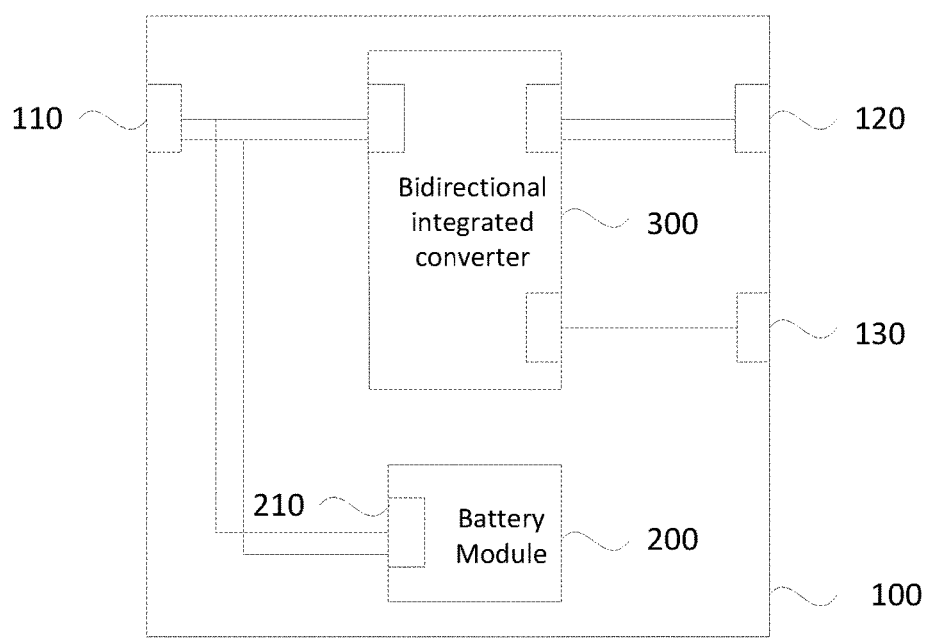
FIG. 5 is a structural schematic diagram of a multi-port energy storage battery provided in the Embodiment three of the present application.

FIG. 5 is a structural schematic diagram of a multi-port energy storage battery provided in Embodiment 3 of the present application, and the multi-port energy storage battery includes:
a first port 110, a second port 120, and a third port 130, where the first port 110 is a 48V DC voltage port, the second port 120 is a 400V DC voltage port, and the third port 130 is a 120/240V AC voltage port;
a battery module 200, including a first interface 210, the first interface 210 is coupled to the first port 110, the battery module 200 provides 48V DC current; and
a bidirectional integrated converter 300 operating in a DC-DC converting mode, a AC-DC converting mode or a DC-AC converting mode, where the bidirectional integrated converter 300 is respectively connected to the first port 110, the second port 120, and the third port 130, and one of the first port 110, the second port 120, and the third port 130 is connected to external power supply.

In an embodiment where the multi-port energy storage battery needs to be charged, the first port 110 is connected to the external power supply when the charging voltage provided by the external power supply is 48V DC voltage; in an embodiment where the charging voltage provided by the external power supply is 400V DC voltage, the second port 120 is connected to the external power supply, and the bidirectional integrated converter 300 operates in the DC-DC converting mode to reduce the charging voltage provided by the external power supply to 48V DC voltage and charge the 48V DC voltage into the battery module 200 through the second port 120; and, in an embodiment where the charging voltage provided by the external power supply is 120/240V AC voltage, the third port 130 is connected to the external power supply, and the bidirectional integrated converter 300 operates in the AC-DC converting mode, converts the 120/240V AC voltage provided by the external AC power supply into 48V DC voltage, and then charges the 48V DC voltage into the battery module 200 through the third port 130.

In an embodiment where the multi-port energy storage battery needs to be discharged, when the external demand voltage is the 48V DC voltage, the first port 110 is used as an output port, and the battery module 200 directly supplies external power through the first port 110; when the external demand voltage is 400V DC voltage, the second port 120 is used as an output port, and the bidirectional integrated converter 300 operates in the DC-DC converting mode to boost the 48V DC power provided by the battery module 200 to 400V DC voltage and output the 400V DC voltage through the second port 120; and when the external demand voltage is 120/240V AC voltage, the third port 130 is used as the output port, and the bidirectional integrated converter 300 operates in the DC-AC converting mode, the 48V DC power provided by the battery module 200 is converted into 120/240V AC voltage through the bidirectional integrated converter 300 and output through the third port 130. In some embodiments, the external power supply may be a DC or AC power source, which can be a photovoltaic system, power grid, electric vehicle, or oil engine.

Embodiment 4

Figure 6:
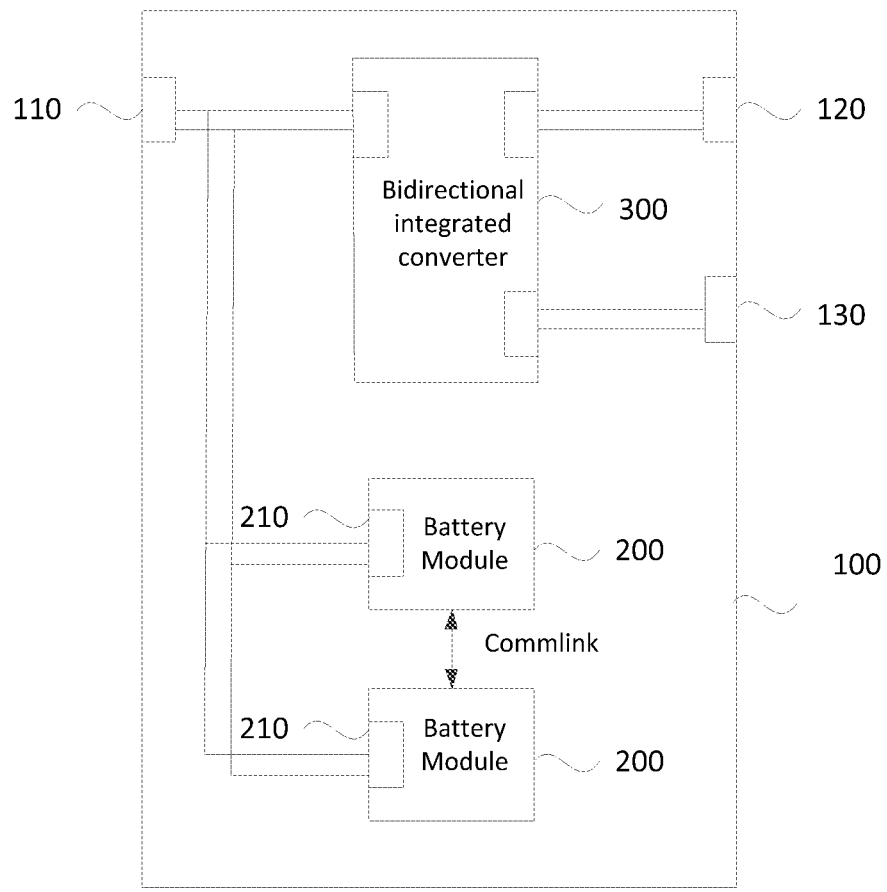
FIG. 6 is a structural schematic diagram of a multi-port energy storage battery provided in the Embodiment four of the present application.

FIG. 6 is a structural schematic diagram of a multi-port energy storage battery provided in Embodiment 4 of the present application. Embodiment 4 of this application is an improvement on the basis of Embodiment 3 of this application. In this embodiment, a plurality of battery modules 200 are parallel connected, each of the plurality of battery modules 200 parallel connected includes a battery management system (BMS), and the plurality of battery modules parallel connected communicate with each other through the BMS.

BMS is a device that cooperates with monitoring the status of energy storage batteries, mainly for intelligent management and maintenance of various battery units, to prevent overcharging and discharging of batteries, extend the service life of batteries, and monitor the status of batteries. BMS is one of the core subsystems of the battery energy storage system, responsible for monitoring the operation status of each battery in the battery energy storage unit, and ensuring the safe and reliable operation of the energy storage unit. BMS can monitor and collect the status parameters of energy storage batteries in real-time (including but not limited to individual battery voltage, battery pole temperature, battery circuit current, battery pack terminal voltage, battery system insulation resistance, etc.), and conduct necessary analysis and calculation of relevant status parameters to obtain more system status evaluation parameters, and achieve effective control of the energy storage battery body based on specific protection and control strategies, ensure the safe and reliable operation of the entire battery energy storage unit. At the same time, BMS can exchange information with other external devices (PCS, EMS, etc.) through its own communication interface and analog/digital input interface, forming a linkage control of various subsystems within the entire energy storage plant, ensuring safe, reliable, and efficient grid connection operation of the system.

Embodiment 5

Figure 7:
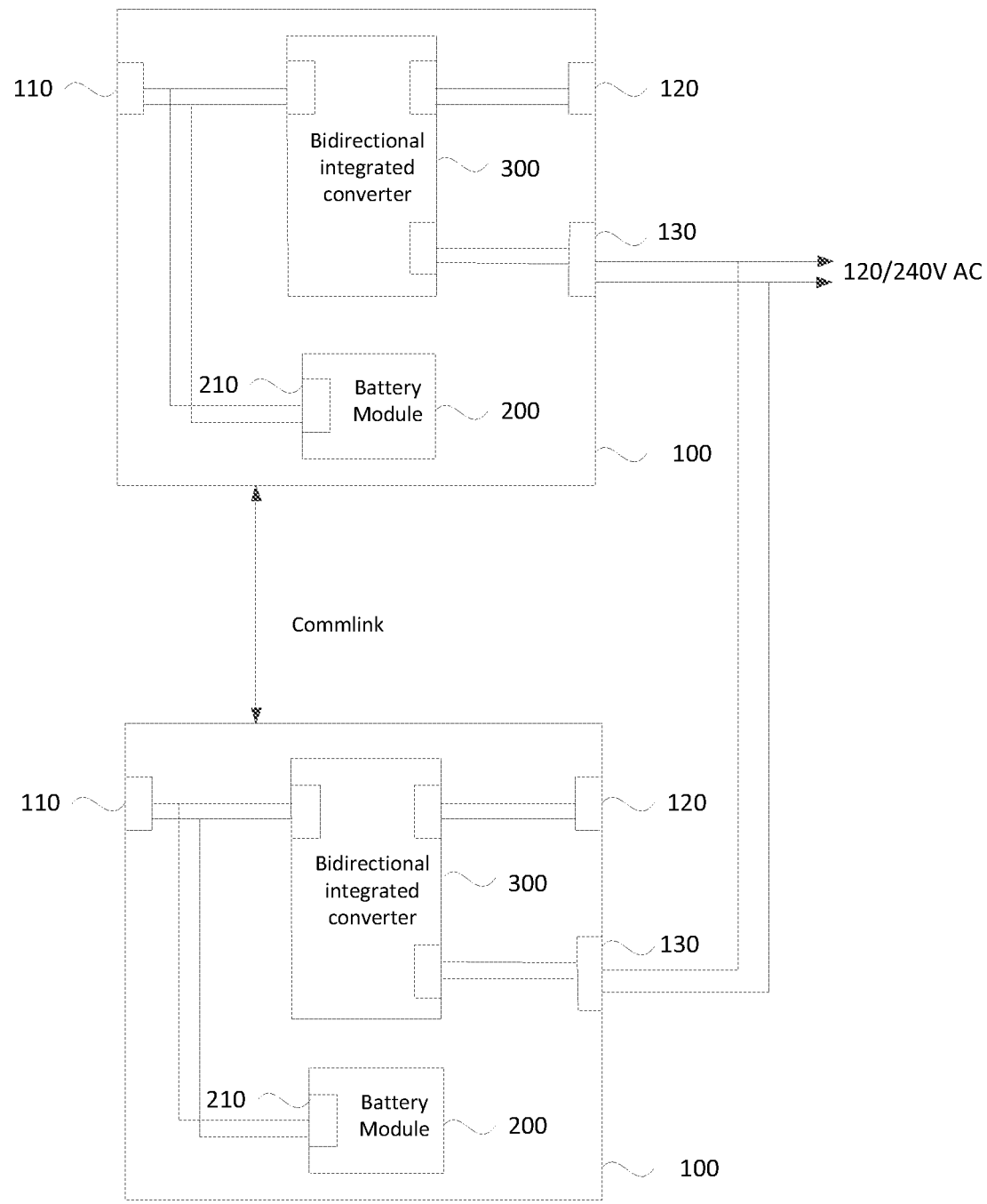
FIG. 7 is a structural schematic diagram of a multi-port energy storage battery pack provided in the Embodiment five of the present application.

FIG. 7 is a structural schematic diagram of a multi-port energy storage battery pack provided in Embodiment 5 of the present application. The multi-port energy storage battery pack can include multiple multi-port energy storage batteries in Embodiment 4, where the first ports 110 of the multiple multi-port energy storage batteries are connected to each other, the second ports 120 of the multiple multi-port energy storage batteries are connected to each other, and the third ports 130 of the multiple multi-port energy storage batteries are coupled to each other, and the multiple multi-port energy storage batteries communicate with each other through a communication interface.

In some embodiments, the communication port supports RS-485 (Recommendation Standard) or CAN bus (Controller Area Network) communication protocols.

In some embodiments, each battery module of multiple multi-port energy storage batteries includes multiple battery modules parallel connected, each of which includes a BMS, and the multiple battery modules parallel connected communicate with each other through the BMS.

Embodiment 6

Figure 8:
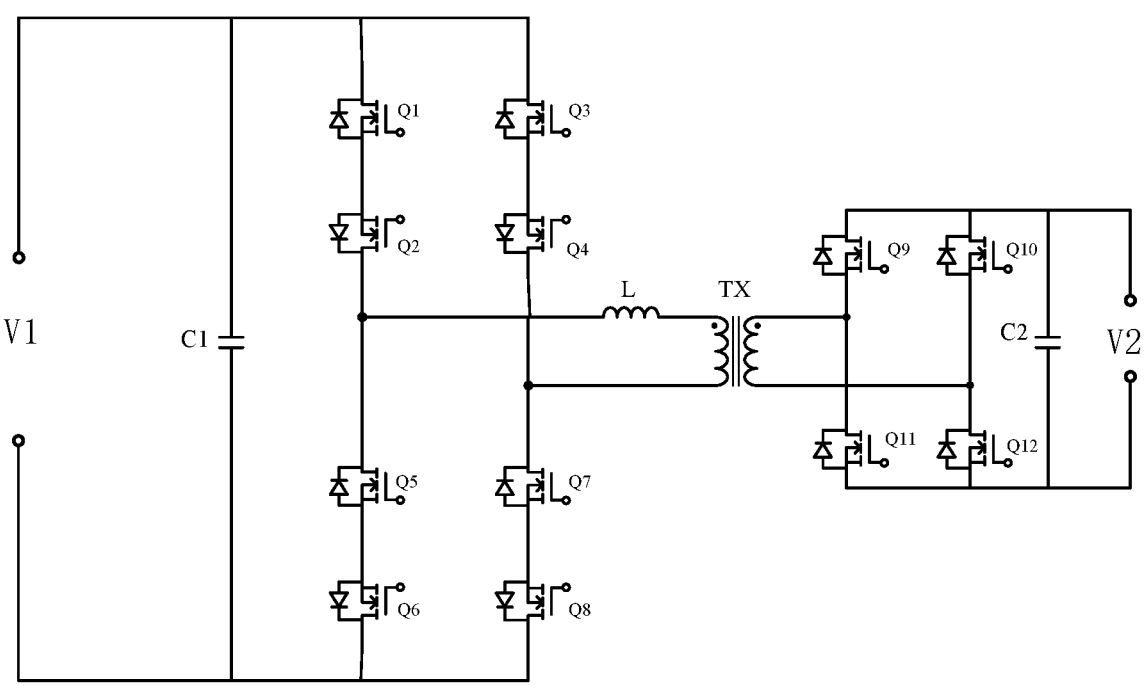
FIG. 8 is a structural schematic diagram of a bidirectional integrated converter provided in the Embodiment six of the present application.

FIG. 8 is a structural schematic diagram of a bidirectional integrated converter provided in Embodiment 6 of this application. The V1 side is usually the high-voltage DC side or AC voltage side of the bidirectional integrated converter, and the V2 side is usually the low-voltage DC side of the bidirectional integrated converter.

When the bidirectional integrated converter operates in the boost DC-DC mode of 48V DC-400V DC, Q1~Q12 uses PWM modulation, with Q9~Q12 as the main switch and Q1~Q8 as the rectifier switch. When V1 and V2 are stable DC voltages, the PWM duty cycle is a constant value. When the voltage on one or both sides of V1 and V2 changes slowly, the PWM duty cycle will adjust in real-time with the slow change.

When the bidirectional integrated converter operates in the step-down DC-DC mode of 400V DC-48V DC, Q1~Q12 uses PWM modulation, where Q1~Q8 are the main switches and Q9~Q12 as the rectifier switches. When V1 and V2 are stable DC voltages, the PWM duty cycle is a constant value. When the voltage on one or both sides of V1 and V2 is slowly changing, the PWM duty cycle will adjust in real-time with the slow change.

When the bidirectional integrated converter operates in the step-down DC-DC mode of 400V DC-48V DC, Q1~Q12 uses PWM modulation, where Q1~Q8 are the main switches and Q9~Q12 are the rectifier switches. When V1 and V2 are stable DC voltages, the PWM duty cycle is a constant value. When the voltage on one or both sides of V1 and V2 is slowly changing, the PWM duty cycle will adjust in real-time with the slow change.

When the bidirectional integrated converter operates in the DC-AC mode of 48V DC-120/240 AC, SPWM or SVPWM modulation is used for Q9 to Q12 on the V2 side, where Q9 and Q12 switch timing are synchronized, and Q10 and Q11 switch timing is synchronized. On the power frequency positive half cycle V1 side, Q1&Q2, Q7&Q8 are continuously on, Q3&Q4, Q5&Q6 are continuously off, and on the V2 side, Q9&Q12 and Q10&Q11 operate in a complementary on/off switching mode where the duty cycle varies with sinusoidal characteristics. On the power frequency negative half cycle V1 side, Q1&Q2, Q7&Q8 are continuously turned off, Q3&Q4, Q5&Q6 are continuously turned on, and on the V2 side, Q9&Q12 and Q10&Q11 operate in a complementary conduction switching mode where the duty cycle changes with sinusoidal characteristics.

When the bidirectional integrated converter operates in the AC-DC mode of 120/240 A-48V DC, SPWM or SVPWM modulation is used for Q1 to Q8 on the V1 side, and Q1&Q2 and Q5&Q6 on the V1 side operate in a complementary conduction switching mode with sinusoidal characteristics of the duty cycle. Q3&Q4 continuously turns off, Q7&Q8 continuously conducts, and Q9 to Q12 on the V2 side can operate in a non-switching internal diode rectification mode or a synchronous rectification mode in a switching state. On the power frequency negative half cycle V1 side, Q3&Q4 and Q7&Q8 operate in a complementary conduction switching mode where the duty cycle varies with the sine characteristic, Q1&Q2 continuously conducts, Q5&Q6 continuously turns off, and on the V2 side, Q9~Q12 can operate in a non-switching internal diode rectification mode or in a synchronous rectification mode in a switching state.

What is claimed is:

1. A multi-port energy storage battery, comprising:
   a first port, a second port and a third port, wherein the first port is a 48V DC voltage port, the second port is a 400V DC voltage port, and the third port is a 120/240V AC voltage port;
   a battery module, comprising a first interface, the first interface is coupled to the first port, the battery module provides 48V DC current; and
   a bidirectional integrated converter, operating in a DC-DC converting mode, a AC-DC converting mode or a DC-AC converting mode, wherein the bidirectional integrated converter is respectively connected to the first port, the second port, and the third port, and one of the first port, the second port, and the third port is connected to external power supply;
   wherein
   in response to the multi-port energy storage battery being in need for changing, the first port is connected to the external power supply when a charging voltage provided by the external power supply is 48V DC voltage;
   in response to a charging voltage provided by the external power supply being 400V DC voltage, the second port is connected to the external power supply, and the bidirectional integrated converter operates in the DC-DC converting mode to reduce the charging voltage provided by the external power supply to 48V DC voltage and charge the 48V DC voltage into the battery module through the second port; and in response to the charging voltage provided by the external power supply being 120/240V AC voltage, the third port is connected to the external power supply, and the bidirectional integrated converter operates in the AC-DC converting mode, converts the 120/240V AC voltage provided by the external AC power supply into 48V DC voltage, and then charges the 48V DC voltage into the battery module through the third port; and wherein in response to the multi-port energy storage battery being in need for discharging, when an external demand voltage is the 48V DC voltage, the first part is used as an output port, and the battery module directly supplies external power through the first port;

in response to the external demand voltage being 400V DC voltage, the second port is used as an output port, and the bidirectional integrated converter operates in the DC-DC converting mode to boost the 48V DC power provided by the battery module to 400V DC voltage and output the 400V DC voltage through the second port; and in response to the external demand voltage being 120/240V AC voltage, the third port is used as the output port, and the bidirectional integrated converter operates in the DC-AC converting mode, the 48V DC power provided by the battery module is converted into 120/240V AC voltage through the bidirectional integrated converter and output 120/240V AC voltage through the third port.

2. The multi-port energy storage battery of claim 1, further comprising:

a plurality of battery modules are parallel connected, each of the plurality of battery modules 200 parallel connected comprises a battery management system (BMS), and the plurality of battery modules parallel connected communicate with each other through the BMS.

3. The multi-port energy storage battery of claim 1, the external power supply is one of: a photovoltaic system, a power grid, an electric vehicle, or an oil engine.

4. The multi-port energy storage battery of claim 1, wherein the bidirectional integrated converter comprises a first side and a second side, wherein the first side is a high-voltage DC side or an AC voltage side of the bidirectional integrated converter, and the second side is a low-voltage DC side of the bidirectional integrated converter;

when the bidirectional integrated converter operates in the DC-DC converting mode, in response to the first side and second side are stable voltage, a PWM duty cycle is a constant value, and in response to a voltage of one or both of on the first side and the second side are slowly changes, a PWM duty cycle is adjusted in real-time.

5. A multi-port energy storage battery pack, comprising a plurality of multi-port energy storage batteries of claim 1, wherein first ports of the plurality of multi-port energy storage batteries are connected to each other, second ports of the plurality of multi-port energy storage batteries are connected to each other, third ports of the plurality of multi-port energy storage batteries are coupled to each other, and the plurality of multi-port energy storage batteries communicate with each other through a communication interface.

6. The multi-port energy storage battery pack of claim 5, wherein the communication interface includes an RS485 bus interface or a CAN bus interface.

7. The multi-port energy storage battery pack of claim 5, wherein each multi-port energy storage battery comprises a plurality of battery modules parallel connected, each of the plurality of battery modules parallel connected comprises a battery management system (BMS), and the plurality of battery modules parallel connected communicate with each other through the BMS.

* * * * *